Feb. 27, 1973   MICHIYUKI SUGIYAMA ET AL   3,718,560
PROCESS FOR ELECTRODIALYSIS OF SUGAR SOLUTIONS
Filed May 30, 1972   4 Sheets-Sheet 1

INVENTORS
MICHIYUKI SUGIYAMA
YOSHIKUNI TAKATORI
RYOSUKE TOUYAMA
AKIRA NAKAMURA
TEIJI YAMAUCHI
MASAAKI KATO
YOSHIO NAKASHIBA

BY McLean, Morton & Boustead

ATTORNEYS

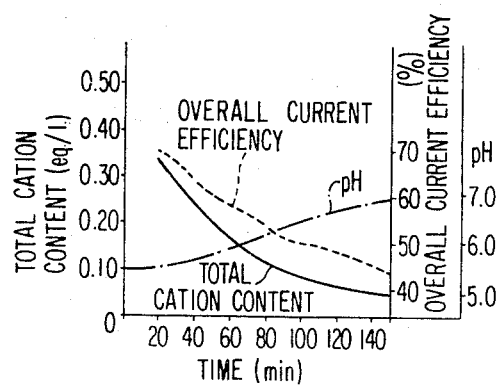
FIG. 8
FIG. 9
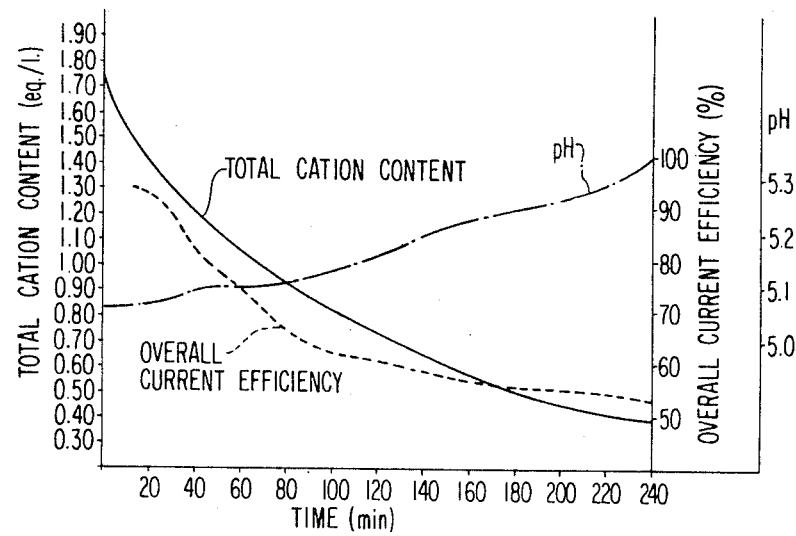
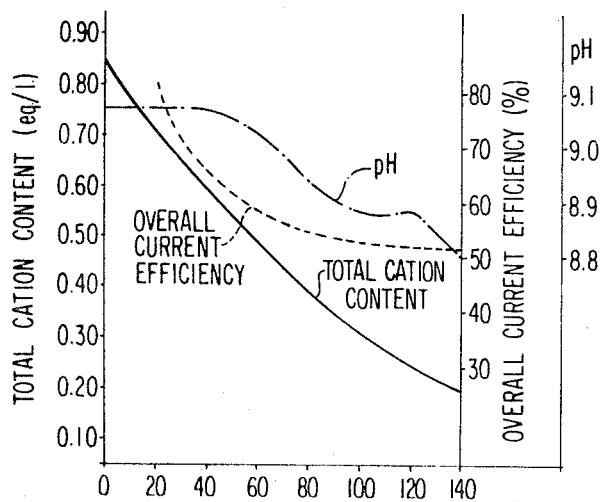
FIG. 10

United States Patent Office 3,718,560
Patented Feb. 27, 1973

3,718,560
PROCESS FOR ELECTRODIALYSIS OF SUGAR SOLUTIONS
Michiyuki Sugiyama, Yoshikuni Takatori, Ryosuke Touyama, Akira Nakamura, Teiji Yamauchi, and Masaaki Kato, Yokohama, and Yushio Nakashiba, Tokyo, Japan, assignors to Taito Co., Ltd., and Asahi Kasei Kogyo Kabushiki Kaisha
Continuation-in-part of application Ser. No. 201,317, Nov. 23, 1971, which is a continuation-in-part of application Ser. No. 52,335, July 6, 1970. This application May 30, 1972, Ser. No. 257,852
Int. Cl. B01d 13/02; B01k 5/00
U.S. Cl. 204—180 P          48 Claims

ABSTRACT OF THE DISCLOSURE

A desalination process for the removal of salts from sugar solutions by electrodialysis in a cell having ion-permeable membranes alternatively disposed between the electrodes by contacting the sugar solution with the alternately disposed ion-permeable membranes comprising having as an anion exchange membrane an ion-permeable membrane with an ion exchange capacity of less than about 0.3 milliequivalent/gram of dry membrane and having as the cation exchange membrane an ion-permeable membrane having cation permselectivity. The desalination process can be advantageously used in sugar refining with additional sugar refining techniques, such as adsorption or carbonation.

---

This application is a continuation-in-part of United States patent application Ser. No. 201,317, filed Nov. 23, 1971, now abandoned, which is turn is a continuation-in-part of United States patent application Ser. No. 52,335, filed July 6, 1970, now abandoned.

The present invention relates to a process for the refining of sugar solutions of various kinds, such as cane sugar, beet sugar, glucose, fructose, etc. More particularly, this invention provides a method for the desalination of sugar solutions by electrodialysis using an ion permeable membrane which desalination method may optionally be combined with additional nonsugar removing refining processes such as carbonation, phosphatation, adsorption, etc., to provide more economical sugar refining techniques.

Figure 1:
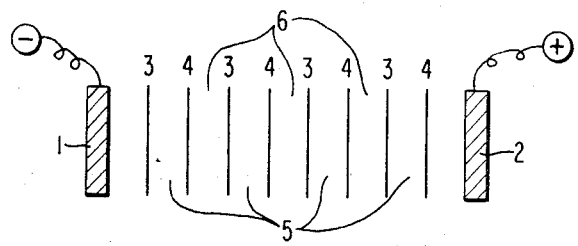

Prior to this invention, two methods for the desalination of sugar solutions have been tried extensively. One method uses a granular ion exchange resin and the other method uses electrodialysis with ion exchange resin membranes. The first method of desalination using granular cation-exchange and anion-exchange resins has technical and economical disadvantages such as the deterioration of anion-exchange resin by organic fouling, the inversion of sucrose due to $H^+$ in a cation-exchange resin process, and the requirement for large amounts of acid and alkali for the regeneration of the resins. The second method comprises the removal of ionizable matters (e.g., salts) in liquid by means of electrodialysis using anion-exchange resin membranes and cation-exchange resin membranes. As is shown in FIG. 1, this conventional procedure forms dilution compartments 5 and concentration compartments 6 by arranging a plurality of cation-exchange resin membranes 3 (hereafter referred to as K membranes) and anion-exchange resin membranes 4 (hereafter referred to as A membranes) alternately between cathode 1 and anode 2. The solution of which the salt content is to be decreased (hereafter referred to as dilution stream) is introduced into dilution compartments 5 and the solution that is to receive the transferred salts from the dilution compartment (hereafter referred to as concentration stream) is introduced into the concentration compartments 6.

When direct current is passed between cathode 1 and anode 2, the ions in each stream migrate toward cathode 1 and anode 2, depending upon the sign of each electric charge; thus desalination of salts occurs in the dilution compartments 5 and concentration of salts occurs in the concentration campartments 6, since the migration of cations is obstructed by the A membranes and that of anions by the K membranes. Such procedures have been commercially employed for desalination of liquids containing inorganic matters as their chief constituents; also such procedures have been applied to desalination of salt-containing liquids containing organic materials as major constituents, such as sugar solutions.

There are two primary defects in the desalination of sugar solutions by this second conventional method. One is that the A membranes are affected by so-called organic fouling which remarkably deteriorates their function by imbedding organic matters contained in sugar solutions therein. As a consequence, the normal life of the membranes is less than about one month. A description of this organic fouling is provided by John H. Payne at pp. 149–150 of the International Sugar Journal, June, 1957. The second primary defect is that sugar, particularly sucrose, is decomposed by a pH decrease in the dilution stream caused by polarization at the surface of the A membranes. This phenomenon is particularly disadvantageous, especially in the refining process of sucrose. Therefore, the adaptation of conventional methods of electrodialysis employing alternately disposed diaphragms (A and K ion exchange membranes) for the desalinating of sugar solutions is particularly disadvantageous, economically and technically. As a result, the industrial use of this method has not been successful.

The present invention may be better understood from the following description of the drawings.

Figure 2:
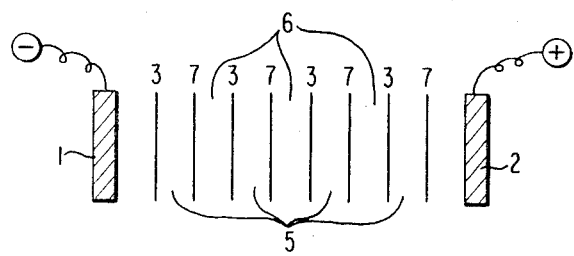
Figure 3:
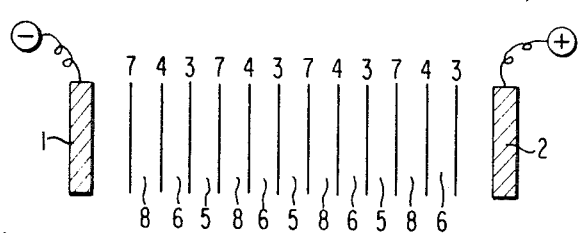
Figure 4:
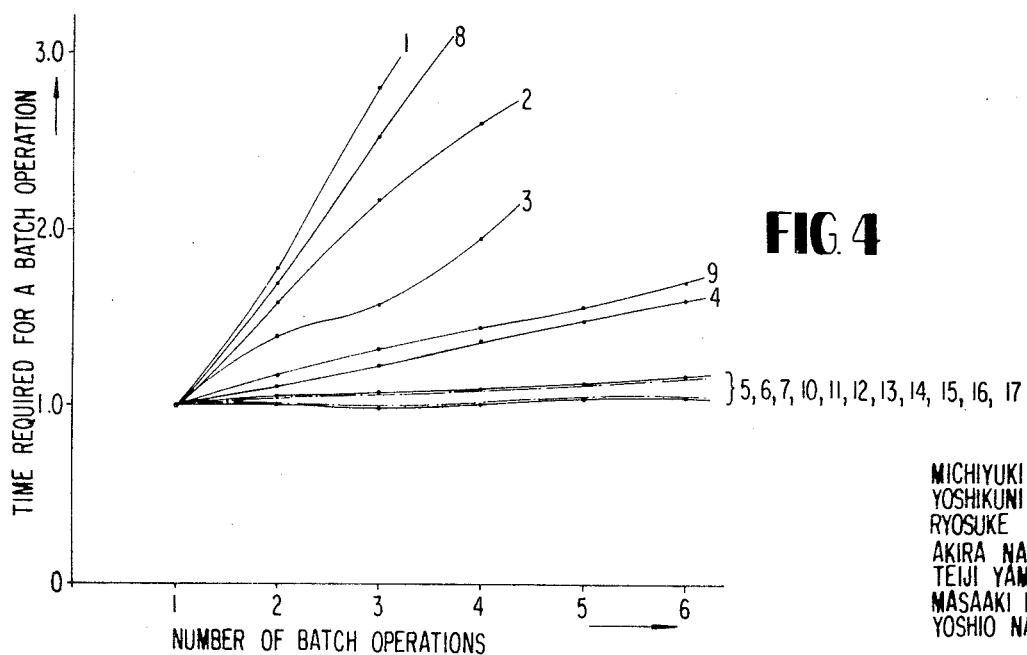
Figure 5:
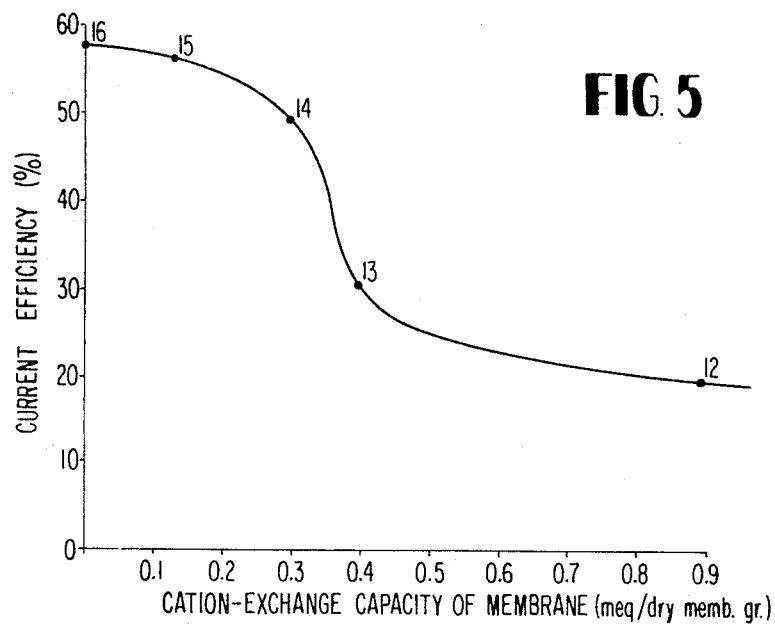
Figure 6:
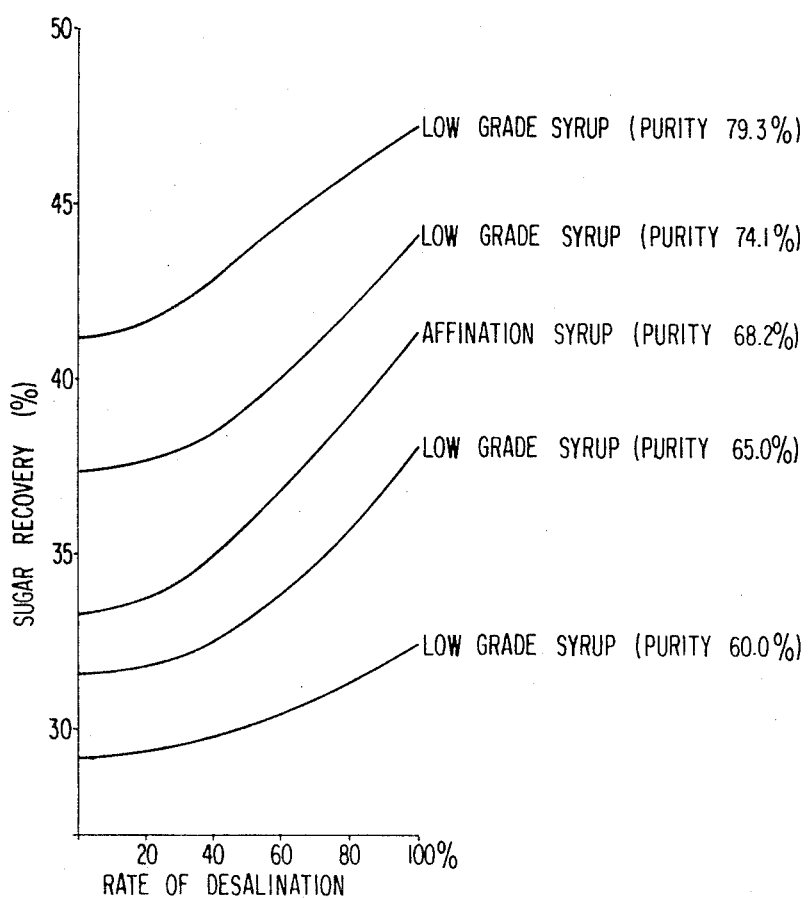
Figure 7:
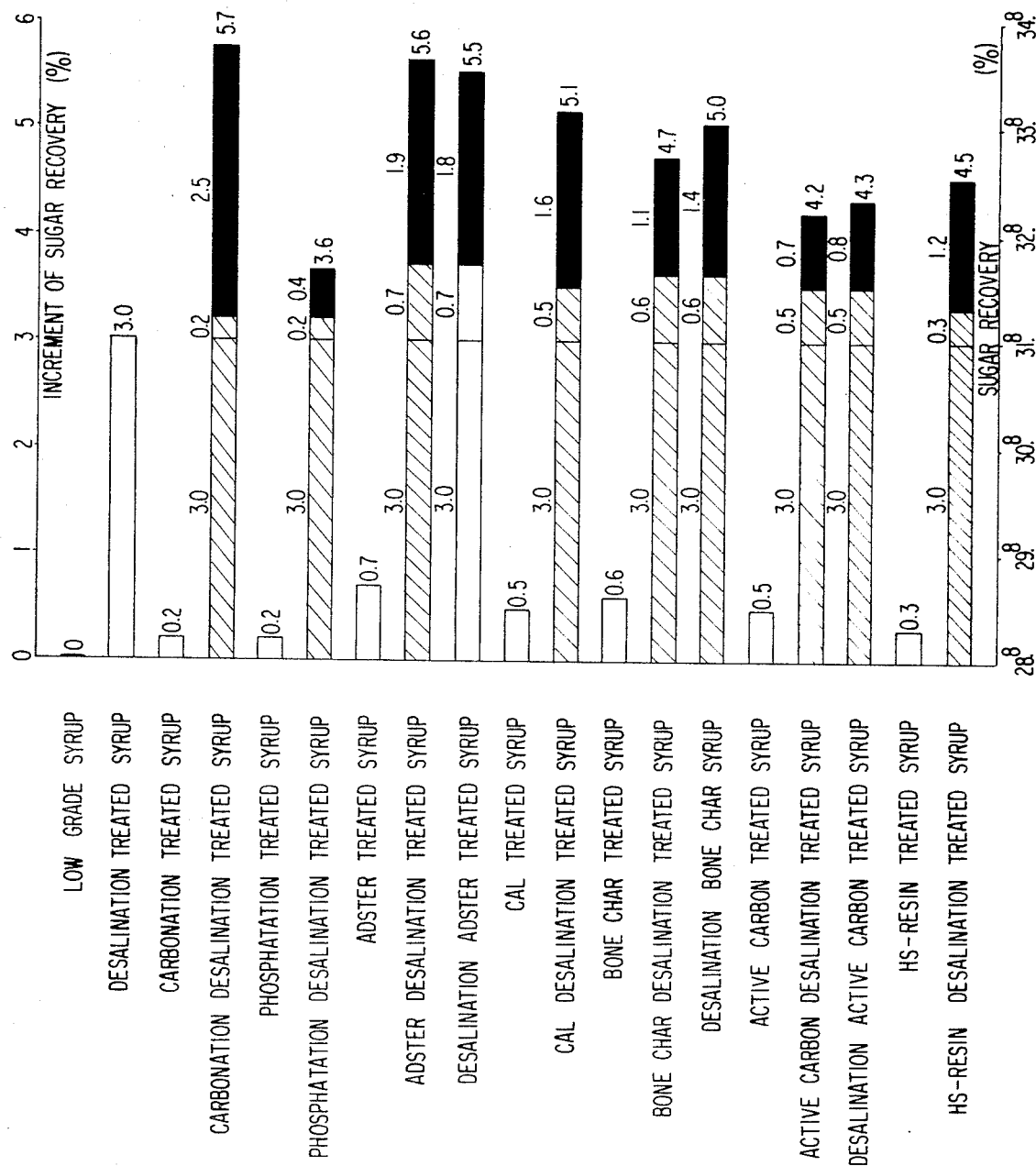

FIG. 1 shows a schematic view of a conventional electrodialyzer. FIG. 2 and FIG. 3 show schematic drawings that are examples of the electrodialyzer of this invention. FIG. 4 is a graph that shows the influence of organic fouling trouble upon the various membranes employed. FIG. 5 is a graph that shows the influence of the various membranes employed on current efficiency. FIG. 6 is a graph that shows the relationship between the degree of desalination of sugar solutions and the sugar recovery. FIG. 7 illustrates the differences between sugar recovery from liquors treated with additional nonsugar removing refining techniques and sugar recovery from untreated liquors. FIG. 8, FIG. 9, and FIG. 10, corresponding to Examples I, V, and VI, respectively, are graphs showing the change of pH and total cation content and overall current efficiency of treated liquor during desalination processes by electrodialysis.

The present invention relates to the improved refining of sugar solutions such as cane sugar solutions and beet sugar solutions. More particularly, this invention provides a desalination method for the refining of sugar solutions by electrodialysis using ion permeable membranes. Optionally the desalination method may be combined with nonsugar removing refining processes such as carbonation, phosphatation, and adsorbing to provide more economical sugar refining techniques. The successful operation of the process of this invention is believed to be based upon the following findings:

(1) It is possible to desalinate sugar solutions by electrodialysis using as an anion-exchange resin membrane an ion permeable membrane that has an ion-exchange capacity of less than about 0.3 meq./dry memb. gr. and cation-exchange resin membranes.

(2) A remarkable increase in sugar recovery is brought about by removing more than about 30% of the ash content by the method described in (1).

(3) A further remarkable increase in sugar recovery is accomplished by combining the above desalination process with additional nonsugar removing processes. The present invention is based upon the above three factors, which are described in detail as follows:

[1] DESALINATION OF SUGAR SOLUTION BY ELECTRODIALYSIS

It is well known that in boiling sugar solutions numerous kinds of salts are melassigenic and concomitantly decrease the sugar recovery by disturbing the formation of sugar, particularly sucrose, crystals. A clear explanation of its mechanism, however, has not been as yet determined. This disturbing action on the crystallization of sucrose by salts is described by Andrew Van Hook in pages 174–177 of Principles of Sugar Technology, vol. II, edited by Peter Honig. The salts of K, Na and Ca were added to a sucrose solution, and the resulting disturbing action on the crystallization of sucrose by these salts was examined. Additionally, researchers have presented several formulas to calculate the purity of final molasses as a means to estimate the exhaustability of the final massecuite. For instance, the following formulas appear in pages 374–378 of Introduction to Cane Sugar Technology, by G. H. Jenkins:

(1) Douwes Dekker formula

Expected purity $= P - ax_1 + bx_2$ wherein; $a$, $b =$ const.; $x_1 =$ hexose percent nonsucrose; $x_2 =$ ash percent nonsucrose; $p =$ constant defined by refining process (e.g., 33.798 in case of carbonation factories).

(2) Queensland formula

Expected true purity $= 40.69 - 17.80 \log x$ wherein; $x =$ reducing sugar/ash.

(3) Hugot formula

Expected purity $= 40 - 4$ reducing sugar/ash.

As is shown in the above formulae, it has previously been noticed that the larger the ash content in a sugar solution to be boiled, the higher is the purity of the molasses. However, all of the foregoing formulae are empirical and thus no definite theory about the relationship between these two factors can be derived. There is also no information on the relationship between ash content of syrups in process and sugar recovery. The difficulty in fathoming the relationship between ash content and sugar recovery is at least partially responsible for the previous lack of a suitable process for desalinating lower purity syrups containing high content of salts. Also, there was little, if any, data regarding how much recovery might be achieved with a certain degree of desalination. By the present invention it can be shown that sugar solutions undergo desalination to some degree without any inversion. Also this invention explains more clearly the relationship between the degree of desalination of syrups in process and the increase of sugar recovery.

Although the present invention is somewhat related to conventional desalination methods carried out by means of electrodialysis using ion permeable membranes, the present invention differs from these conventional methods in that the electrodialysis of sugar solutions can be conducted free from the previously described defects such as rapid deterioration of membranes by organic fouling, pH decrease of treated liquor, and so on. Therefore, this invention makes the desalination of sugar solutions technically feasible and economically advantageous.

We have found that if, instead of conventional A membranes, the ion permeable membranes employed have ion exchange capacity of less than about 0.3 meq./dry memb. gr., no organic fouling of the A membrane or acidification of dilution stream due to polarization take place.

The effects of ion exchange capacity of membranes regarding degree of organic fouling, current efficiency, and desalination of sugar solution, were studied using ion permeable membranes of several ion exchange capacities (including zero capacity of ion exchange). The details of these experiments are described below, wherein the ion exchange capacity indicates salt splitting capacity.

(1) Ion permeable membrane employed

Acceptable ion permeable membranes have substantially non-selective ion permeability less than about 0.3 meq./dry mem. gr. of cation or anion-exchange capacity. For instance, cellulose membranes, pertimentized paper, cellulose acetate membranes, polyvinylalcohol membranes, other ion permeable membranes prepared by polymerization or condensation reaction from polymerizable or condensable monomeric substances, and so forth, may be employed.

Particularly advantageous membranes for use in this invention, that is, those which have cation and anion exchange capacity less than 0.3 meq./dry memb. gr., are films of homopolymers or copolymers of vinyl alcohol. The copolymers of vinyl alcohol contain at least about 10-mole percent $—(CH_2—CHOH)—$. The monomer for the copolymer of vinyl alcohol is selected, when, for example, the polyvinyl alcohol is formed by hydrolysis of a polyvinyl ester, from a group of monomers which readily copolymerize with the vinyl ester. Monomers which readily copolymerize with vinyl esters are, for example, vinyl halides, unsaturated mono and dibasic acids, unsaturated aliphatic and vinyl substituted aliphatic and aromatic hydrocarbons, such as vinyl chloride, dichloroethylene, vinylidene chloride, acrylic acid, maleic acid, fumaric acid, crotonic acid and their esters, maleic anhydride, acrylonitrile, ethylene, styrene, vinyl toluene, phenyl vinyl sulfone, and the like.

The homopolymer or copolymer films of vinyl alcohol can be made in any conventional manner. In one method of preparation of a copolymer film of vinyl alcohol, for example, at least one vinyl ester, such as vinyl formate, vinyl diethyl acetate, vinyl t-butyl acetate, vinyl benzoate, vinyl-2,4-dimethyl pentanoate, vinyl laurate, vinyl isocaproate, vinyl salicylate, vinyl palmitate, vinyl sulfonate, and the like, is copolymerized with a monomer which readily copolymerizes with the vinyl ester to form a linear polymer. The vinyl ester preferably comprises 10 to 100 mole percent of the total polymerizable monomer. In addition to the monomers, it may be desirable to add an initiator to the polymerization mixture. Preferably, the initiator is in an amount ranging from 0 to 5 mole percent of the total monomer. The initiator is normally of the type employed for radical copolymerization, for instance, organic peroxides, such as benzoyl peroxide, lauroyl peroxide, dichlorobenzoyl peroxide and the like, and inorganic peroxides, such as hydrogen peroxide, potassium persulfonate, ammonium persulfonate, azobisnitriles, such as d,d$^1$-azobis-isobutylonitrile, and the like.

Solvents which take no active part in the copolymerization, such as alcohols, ketones, ethers, alcohol ketones, alcohol-ethers, alcohol esters, and the like, may be added to the polymerization mixture. Examples of suitable solvents are methanol, ethanol, n-propanol, isopropanol, butanol, acetone, methylethyl ketone, dimethyl oxyethane, methyl Cellosolve, dioxane, dimethyl formamide, tetrahydrofuran diethyl-ether, and the like. Solvents for the vinyl monomers include aliphatic hydrocarbons, such as pentane, hexane, octane and the like, aromatic hydrocarbons, such as toluene, xylene, and the like, and cycloaliphatic hydrocarbons such as cyclohexane Decalin, and the like. The solvent can be present in an amount of between 0 and about 70 weight percent of the total mixture.

The mixture can be polymerized in a closed vessel at a temperature ranging from about 0 to 120° C. Preferably, the polymerization is continued to give a polymer or copolymer having a degree of polymerization from about 500 to about 5000, and preferably from about 1000 to about 4500. The polymer or copolymer may also be prepared by emulsion polymerization, suspension polymerization, or the like.

The ester-containing polymer can be cast into the desired thin film shape for the membrane either before or after saponification in any conventional manner. The method used for casting the polymer into a thin film for the membrane can be either the wet, dry or melt film forming processes. Advantageously, the dry casting method can be employed to form the film. One means of carrying out the dry casting or powder casting method of producing thin films for use as membranes is by spraying a fine powder of the polymer or copolymer onto the heated surface of a drum. Various other methods of casting a film can be found in the Encyclopedia of Chemical Technology, second edition, volume 9, pages 232 to 243, published by John Wiley and Son, Inc.

Conventional techniques of hydrolysis can be used to saponify the ester-groups in the polymer or copolymer employing either alkalies or acids. One method of hydrolysis comprises contacting the polymer with, for instance, a methanol solution, saturated with, for example, potassium hydroxide. Further suitable methods of saponification and hydrolysis are described in the Encyclopedia of Chemical Technology, second edition, volume 7, page 12. The hydrolysis of the polyvinyl ester membrane may be complete so as to saponify all of the ester groups to hydroxyl groups, or it may be partial so as to saponify a sufficient amount of the ester groups in order that the polymer has at least about 10-mole percent

—($CH_2CHOH$)— groups.

In some cases it may be desirable to subject the polyvinyl alcohol membrane to partial esterification. It has been found that partial esterification of the polyvinyl alcohol membrane improves its stability of dimension in an aqueous environment. It is desirable that after partial esterification, the polymer contains at least about 10-mole percent —($CH_2CHOH$)— groups. Partial esterification of the membrane can be effected by, for example, swelling the polyvinyl alcohol film in a solution of about 20 to about 50 percent by weight pyridine in chloroform. The swollen film can then be reacted with a solution of about 10 to about 40 weight percent stearyl chloride in pyridine until the desired amount of esterification of the polyvinyl alcohol has occurred.

Some other ion permeable membranes employed in the experiments of this invention are shown in Table A. The membranes of Nos. 1–7 and Nos. 12–15 in Table A are prepared from basic constituents of styrene, divinylbenzene and butadiene according to the method described in Japanese Pat. No. 235,132 and No. 235,133. The membranes of Nos. 8–11 in Table A are prepared from basic constituents of 4-vinylpyridine, styrene and divinylbenzene according to the method described in Japanese Pat. No. 456,951. No. 16 and No. 17 are commercially available cellulose dialysis tubings.

(2) Determination of organic fouling and electric current efficiency

Desalination processes were conducted with 40 volts D.C. applied to both ends of a membrane stack, using Aciplex CK–1 manufactured by Asahi Chemical Industry Co., Ltd. as the K membrane and each of the membranes shown in Table A as the A membrane. Effective membrane areas of 50 mm. x 155 mm. and a membrane distance of 0.75 mm. were used, and 20 pairs of membranes were disposed as shown in FIG. 2. As a dilution stream, 10 liters of affination syrup containing 0.846 equivalent/liter of ionizable components and adjusted to 50.6° Bx was circulated at a flow rate of 4.5 liters/minute through dilution compartments, while as a concentration stream sea water was passed at a flow rate of 1 liter/minute through concentration compartments, with the liquid discharged from the concentration compartments being discarded. Each batch operation was continued until the content of ionizable components dropped down to less than 0.170 equivalent/liter. In this experiment, the above described operation was repeated six times, without changing any membranes used, to determine the operation time for desalination.

Thereafter the time required for one batch operation from the first operation to the sixth was determined on several kinds of ion permeable membranes. The times required for one batch operation in each batch operation after the second batch were calculated based upon the time for the first batch operation by obtaining the ratio of times. By this method, it is clear that if the operation time required for one batch was remarkably extended compared to that of the initial operation as the operation was further repeated, organic fouling occurred on the membranes used. To the contrary, if the operation time required for one batch did not substantially change, even if the operation was repeated on second, third, and so on batches, the membranes used did not suffer organic fouling. It is possible to choose membranes suitable for electrodialysis of sugar solutions from the results of this experiment. According to FIG. 4, Nos. 5–7 and Nos. 10–17 are such membranes.

Further, using No. 12–14, membranes having a cation-exchange group, and No. 16 and No. 17, membranes having no ion-exchange group, the current efficiency during the first batch operation was measured for each membrane, and, then, the relationship between the cation-exchange capacity of each ion permeable membrane is determined as shown in FIG. 5. According to this, No. 12 and No. 13 having more than about 0.3 meq./dry memb.

TABLE A

| Number of membrane | Basic constituents | Manufacturing method | Ion exchange group | Capacity of ion exchange [1] | Manufacturer |
|---|---|---|---|---|---|
| 1 | Styrene, divinylbenzene, butadiene. | Japanese Patent No. 235,132 | Trimethylammonium chloride group. | 1.80 | Asahi Chemical Industry Co. Ltd. |
| 2 | do | do | do | 1.04 | Do. |
| 3 | do | do | do | 0.71 | Do. |
| 4 | do | do | do | 0.42 | Do. |
| 5 | do | do | do | 0.27 | Do. |
| 6 | do | do | do | 0.10 | Do. |
| 7 | do | do | do | 0.08 | Do. |
| 8 | Styrene, divinylbenzene, 4-vinylpyridine. | Japanese Patent No. 456,951 | Quaternary methyl pyridinium chloride group. | 1.10 | Do. |
| 9 | do | do | do | 0.52 | Do. |
| 10 | do | do | do | 0.25 | Do. |
| 11 | do | do | do | 0.10 | Do. |
| 12 | Styrene, divinylbenzene, butadiene. | Japanese Patent No. 235,133 | Sulfonic group | 0.91 | Do. |
| 13 | do | do | do | 0.40 | Do. |
| 14 | do | do | do | 0.30 | Do. |
| 15 | do | do | do | 0.13 | Do. |
| 16 | Cellulose | | None | 0.00 | U.C.C. dialysis tubing 3¼ s. |
| 17 | do | | do | 0.00 | U.C.C. dialysis tubing c-117. |

[1] Milliequivalents per gram of dry membrane.

gr. of cation-exchange capacity showed very poor current efficiency.

As a summary of the results of these experiments, it has been found that when ion permeable membranes having more than 0.3 meq./dry memb. gr. of anion-exchange capacity are employed, a remarkable organic fouling normally occurs and when ion permeable membranes having more than about 0.3 meq./dry memb. gr. of cation-exchange capacity are employed a remarkable decrease in current efficiency occurs causing unfavorable effects. Ion permeable membranes employed in this invention are acceptable if these disadvantages are overcome. Thus, useful membranes are not confined to the specific membranes used herein. Accordingly, acceptable ion permeable membranes have substantially non-selective ion permeability less than about 0.3 meq./dry memb. gr. of cation or anion-exchange capacity. For instance, cellulose membranes, pertimentalized paper, cellulose acetate membranes, polyvinylalcohol membranes, other ion permeable membranes prepared by polymerization or condensation reaction from polymerizable or condensable monomeric substances, and so forth, may be employed.

[2] THE EFFECT OF DESALINATION ON SUGAR RECOVERY

The following experiment was conducted in order to show the effect on sugar recovery resulting from the desalination of sugar solutions by the method of this invention.

After finishing desalination treatment at approximately 20% intervals of the degree of desalination using each of low grade syrups having 79.3%, 74.1%, 65.0%, and 60.0% purity and a green syrup of 68.2% purity, the treated liquors were boiled in a test vacuum pan to study the changes of the degree of desalination and sugar recovery. The results are shown in FIG. 6, indicating that the sugar recovery increased as the degree of desalination proceeded. The increase of sugar recovery appears fairly slow up to about the 20% level of the degree of desalination and the increase of sugar recovery was very steep after about the 30% level of the degree of desalination. The above-mentioned phenomena are an entirely new development dependent upon the desalination method of this invention suitable for application to sugar solutions. Therefore, this invention provides a method of remarkably increasing sugar recovery by decreasing the concentration of ionizable impurity in sugar solution under about the 70% level of the initial concentration of such impurity.

An example of a schematic view of an electrodialyzer useful in this invention is shown in FIG. 2, and another example in FIG. 3. In each case, the sugar solution to be treated was contacted only with the cation exchange resin membranes and the substantially non-selective ion permeable membranes 7 (hereafter referred to as NS membrane) having less than about 0.3 meq./dry memb. gr. of the above-mentioned ion exchange capacity.

In FIG. 2, wherein, a plurality of K membranes 3 and NS membranes 7 are arranged alternately between a cathode 1 and anode 2 pair, dilution compartments and concentration compartments are formed when D.C. voltage is applied between cathode 1 and anode 2, as in the conventional electrodialysis using the A membranes and the K membranes. Then the ionizable components to be removed existing in the dilution compartments are transferred into the concentration compartments 6 through the K membrane and the NS membrane when the dilution stream of sugar solution containing these ionizable components is passed through the dilution compartments 5 and the concentration stream receiving the ionizable components transferred from the dilution stream is passed through the concentration compartments 6.

In FIG. 3, the middle compartments 8 are set up between the dilution compartments 5 and the concentration compartments 6; a plurality of the K membranes 3, the NS membranes 7, and the A membranes 4 are disposed between a cathode 1 and anode 2 pair as shown in the drawing. The ionizable components existing in the dilution compartments 5 and the middle compartments 8 are transferred into the concentration compartments 6, by applying D.C. voltage between the cathode 1 and the anode 2. A suitable electrolytic aqueous solution (middle compartment rinse stream) is passed through the middle compartments 8; the sugar solution containing the ionizable component to be removed is passed through the dilution compartments 5; and the concentration stream receiving the ionizable components transferred from the dilution stream is passed through concentration compartments 6. When ionizable components in sugar solution are removed according to the above described system, a small amount of sugar leakage through the NS membranes 7 occurs. There is no overall sugar loss, however, since sugar which leaked into the middle compartments 8 through the NS membranes 7 is recovered by returning the middle compartment rinse stream to the dilution stream in a continuous or batchwise manner.

By the desalination process in this invention, thicker solutions can be effectively desalinated, since this method is free from the pH decrease of the dilution stream due to polarization at the surface of the A membrane in the conventional method.

An aqueous electrolytic solution such as NaCl, $Na_2SO_4$, sea water, etc. is used as the concentration stream or the middle compartment rinse stream. These solutions are adjusted to a proper concentration depending upon the content of ionizable components in dilution stream. The operating conditions such as the current density, the flow rates, and the content of ionizable component in the concentration stream or middle compartment rinse stream can be properly chosen according to the degree of desalination to be required and the content of ionizable components in the dilution stream, kinds of syrups, etc.

[3] FURTHER SUGAR RECOVERY PROCEDURES UTILIZING DESALINATION BY ELECTRODIALYSIS AND ADDITIONAL NONSUGAR REMOVING REFINING PROCESSES

The present invention also includes processes making possible remarkably increased sugar recovery by combining the desalination by electrodialysis using the ion permeable membrane of less than about 0.3 meq./dry memb. gr. of ion-exchange capacity and cation exchange membrane with one or more additional refining processes such as defecation, carbonation, phosphatation, adsorption as by bone char, granular active carbon, powdered active carbon, ion exchange resin, resinous adsorbents. One or more of these processes may be adopted before and/or after the above described desalination process.

For instance, in a raw cane sugar factory, a defecation process is generally employed, wherein organic nonsugar matter such as protein is precipitated by coagulation normally by the addition of lime milk to the sugar juice to be processed. Also, in a plantation white sugar factory, a carbonation process is generally thereafter employed, wherein carbon dioxide is passed thruogh the sugar juice to which lime milk has been added to precipitate $CaCO_3$, which absorbs impurities and is filtered, to obtain a clear juice. Sulphitation, wherein sulfurous acid gas contacts the juice, is also used. Additionally, in a beet sugar factory, the beet diffusion juice is normally treated with carbonation, and in some cases this juice is then further decolorized by a method using Cl-type anion exchange resins.

In sugar refining, after affinating and melting raw sugar and removing organic nonsugar substances by methods such as carbonation or phosphatation, the resulting clarified liquor is filtered and, then, treated with the adsorbent such as bone char, granular active carbon, powdered active carbon, and in some cases further treated with a decolorizing ion exchange resin to obtain a colorless fine liquor to be boiled. The methods described above are useful mainly to remove, to some extent, organic nonsugar substances, especially colorants, protein, gum, etc. Salt substances are only scarcely removed by these refining processes, and even the removal of the organic substance is not always complete, even when using adsorption techniques to reduce ash content with bone char, for example.

Therefore, although it is generally useful for clarification of sugar solutions to combine several processes, even such combinations do not increase purity and recovery beyond a certain limit and a considerable amount of final molasses is produced. For this reason, effort has been directed to the study of methods of removing salt matters from sugar solutions. However, hitherto, no method has been able to accomplish completely this object of desalination, and above all, there have been no means that can be utilized on commercial scale for the desalination of sugar solutions containing high ash content.

In this invention, we have found that a further remarkable increase in sugar recovery may be accomplished by a proper combination of conventional refining methods and the desalination of this invention. As the result of our study of the relationship between the above described desalination with conventional refining processes such as clarification, adsorption and decolorization to remove organic nonsugar matters, it is apparent that the effect of desalination is a multiplicative effect showing much greater value than the sum of two values that were obtained under the same conditions independently. It has been proved that the desalination method combined with conventional refining methods not only recovered sugar in high yield, but also the final undesirable molasses was converted by this method to edible syrup. The method of the present invention is remarkable, since the method remarkably improves sugar recovery as well as the overall refining process, while the conventional refining methods generally did not increase yield but only aided refining. Accordingly, we have established by this invention a multiplicative effect using conventional refining processes in conjunction with our desalination.

As mentioned above, the refining method for sugar solutions of this invention therefore includes the feature of a combination comprising the desalination process using an electrodialyzer having a plurality of dilution compartments that are equipped with the cation exchange membrane at the cathode side and with ion permeable membrane having less than about 0.3 meq./dry memb. gr. of ion exchange capacity at the anode side with the refining methods of carbonation, phosphatation, adsorption with bone char, granular active carbon, powdered carbon, resinous adsorbents, etc. useful for removing organic nonsugar matter. The following is a more detailed description thereof.

The effectiveness in sugar recovery that is accomplished by the above mentioned combination is shown in FIG. 7. This figure illustrates by rod type graphs a comparison of the increment of sugar recovery when the above mentioned electrodialysis desalination process and the several refining processes are applied separately and the increment of sugar recovery with treatment by combining the electrodialysis desalination process with one of the several refining processes. The origin is the point of the recovery (28.8%) when raw sugar solutions such as a low grade syrup in a sugar refinery with purity of 59.3%, reducing sugar of 18.0% and sulfate ash of 9.68% is boiled. In the graph of FIG. 7, the clear portion is a sum of the increment (3.0%) of sugar recovery obtained by the desalination process alone and the increment of recovery obtained by one of the several refining processes. The black portion shows the multiplicative effect accomplished by the combination of the two processes.

For instance, with pretreatment by Adster (the trade name of granular active carbon manufactured by ADS Chemical Co., Ltd.) and subsequent desalination, remarkably 34.4% of sugar recovery is accomplished; that is higher by 5.6% than that obtained by the two steps separately. This 5.6% increase is a 19.4% recovery against the raw solution. It should be understood that the 5.6% increment of recovery by Adster-desalination combination results from multiplicative effect. Contrast the sum of 3.7% made by a 3.0% increment of recovery by a treatment with desalination and a 0.7% (2.4% to raw solution increment of recovery by Adster treatment alone.

Such multiplicative effect can be observed also with carbonation 2.5% (8.7% to raw solution the highest rate), phosphatation, and adsorption with granular carbon, CAL (brand name, manufactured by Calgon Corporation), bone char, active carbon, HS-resin (brand name of resinous adsorbent manufactured by Hokuetsu Tanso Kogyo Co., Ltd.). In case of Adster and an active carbon treatment, there is little difference in recovery if these treatments are conducted before or after the desalination; however, it makes some difference with some refining steps, such as with adsorption with bone char, which themselves may accomplish some desalination. In such case the desalination of this invention should be conducted before the other refining process to obtain a greater multiplicative effect.

The use of affination syrup (hereafter referred to as A.S.) having higher purity than the above mentioned low grade syrups in sugar refining and subjecting it to carbonation, results in the ash content in the treated liquor being lowered to show decolorization by 51% in Stammer color value and higher sugar recovery by 2.1% than that of the sugar recovery of A.S. raw solution. This increase was 6.5% on the recovery of A.S. raw solution, and if further desalination process was applied, a remarkable increase, as much as 22.5% was complished on recovery of A.S. raw solution.

As to the reason for increasing recovery, several reasons are possible. It is assumed that there is a certain relationship between the amount of nonsugar and the crystallization, since it is assumed that the presence of organic and inorganic matters, associated with each other, disturbs the crystallization of sugar. However, whatever the reason may be, the present invention shall not be limited in any manner thereby.

The treatment by this method not only increased the sugar recovery in one boiling step as is seen in the above description, but also brought a favorable effect in the process that has several boiling steps, since the treatment improved the purity and the color value of treated liquor. Thus it becomes possible to return even the final molasses to a suitable step in sugar manufacturing. Also, with low purity syrups such as affination syrup, syrups in process, low grade remelt sugar, low grade syrup, etc. the recovery increase may be substantially increased by using plural steps of the boiling process rather than a one-step boiling process.

EXAMPLE I

After adjusting the ° Bx of a low grade sugar refining syrup to 40.42°, the desalination by electrodialysis using the apparatus employing No. 6 membrane in Table A as the NS membrane and Aciplex CK–1 as the K membrane was conducted. This electrodialysis was carried out by a batch-wise desalination method using an electrodialyzer having membrane distances of 0.75 mm., the membranes set up alternately and 20 pairs of NS and the K membranes each having an effective area of 0.775 dm.$^2$ (width 5 cm. x length 15.5 cm.) on a gasket. Six liters of low grade sugar refinery syrup having 40.42° Bx, purity 62.1%, total cation content of 0.4493 equivalent/liter, and pH value of 5.50 was treated, using 6.0 liters of 0.1 N NaCl solution as the concentration stream. Under operating conditions of cell voltage of 3.2 volts, current density of 5.3–2.1 amperes/dm.$^2$, and flow rate of 100 liter /hour, the desalination process by electrodialysis was conducted for 150 minutes. After 60 minutes the value of 62.9% desalination, 6.0 pH, and overall current efficiency of 59.0% resulted, and after 150 minutes these values were 88.8% desalination, 7.0 pH, and overall current efficiency of 44.7%. The loss of sugar was almost negligible in the above process.

The treated syrup was then boiled in a test vacuum pan, and the sugar recovery from said syrup and that of raw syrup compared. 34.4% recovery was obtained with the treated sugar solution that had desalinated up to 88.8%, while the recovery from untreated syrup (raw syrup) was 29.5%. This was 16.6% increase in recovery compared to that of the untreated syrup.

Table 1 shows the degree of desalination, current efficiency, sugar recovery, etc. of raw syrup and treated syrup in this example. Also, the results of this example are further detailed in FIG. 8.

TABLE 1

|  | °Bx. | Purity, percent | Reducing sugar,[1] percent | pH | Total cation content, eq./l. | Sulfate ash,[1] percent | Desalination rate,[2] percent | Current efficiency, percent | Sugar recovery, percent |
|---|---|---|---|---|---|---|---|---|---|
| Raw syrup | 40.42 | 62.1 | 22.7 | 5.50 | 0.4493 | 5.82 } | 88.8 | 44.7 { | 29.5 |
| Treated syrup | 35.90 | 69.2 | 20.3 | 7.0 | 0.0459 | 0.65 } |  |  | 34.4 |

[1] Reducing sugar and sulfate ash are expressed on a total solids basis.
[2] The desalination rate is obtained from the removing rate of total cation content.

EXAMPLE II

Using the same electrodialyzer as in Example I, the same procedure of desalination by electrodialysis for 180 minutes was repeated, using 6 liters of affination syrup adjusted to 50.6° Bx. and employing No. 5 in Table A as the NS membrane and Selemion CMV as the K membrane. The operating conditions were 3.4 volts cell voltage, 5.7–3.8 amperes/dm.² current density, and 70 liters/hour flow rate. With 64% of desalination, a 37.1% recovery was achieved. This was a remarkable increase of 15.2% against that of the untreated syrup since by repeating the same procedure of boiling as in Example I, the sugar recovery of the untreated syrup was only 32.2%.

The results of this example are shown in Table 2. In this case, the sugar loss by leakage into the concentration stream was 1.5% of the percentage of solids of the untreated raw syrup.

TABLE 2

|  | °Bx. | Purity, percent | Reducing sugar, percent | pH | Total cation content, eq./l. | Sulfate ash, percent | Desalination rate, percent | Current efficiency, percent | Sugar recovery, percent |
|---|---|---|---|---|---|---|---|---|---|
| Raw syrup | 47.8 | 67.7 | 8.79 | 5.75 | 0.7477 | 8.05 } | 64.0 | 42.0 { | 32.2 |
| Treated syrup | 40.4 | 73.8 | 8.90 | 6.10 | 0.2498 | 3.09 } |  |  | 37.1 |

EXAMPLE III

After adjusting °Bx. of 6 liters of final molasses from a sugar refinery to 50.2 and using the same electrodialyzer as in Example I employing No. 17 in Table A as the NS membrane and Aciplex CK–1 as the K membrane, the desalination by electrodialysis was conducted for 240 minutes according to the same procedure as in Example I. The operating conditions were 2.6–2.1 volts cell voltage, 7.5–2.7 amperes/dm.² current density, and 70 liters/hour flow rate. The results of this example are shown in Table 3. In this case, the sugar loss from leakage into the

TABLE 3

|  | °Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 50.2 | 37.5 | 24.0 | 6.0 | 1.1927 | 15.86 } | 68.8 | 52.0 |
| Treated syrup | 37.8 | 46.2 | 24.2 | 6.30 | 0.3222 | 4.50 } |  |  | concentration stream was 1.7% of the percentage of solids of the untreated raw syrup.

EXAMPLE IV

Using the same electrodialyzer as in Example I and employing No. 5 in Table A as the NS membrane and Nepton CR–61 as the K membrane, 3.0 liters of raw cane syrup adjusted to 50.2° Bx. was desalinated by electrodialysis for 150 minutes under the operating conditions of 3.1 volts cell voltage, 1.4–1.0 amperes/dm.² current density, and 70 liters/hour flow rate. The results obtained are shown in Table 4. In this case, the sugar

TABLE 4

|  | °Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 53.1 | 85.1 | 5.03 | 5.10 | 0.2466 | 2.22 } | 78.2 | 40.0 |
| Treated syrup | 42.6 | 89.2 | 5.26 | 5.56 | 0.0622 | 0.52 } |  |  | loss by leaking into the concentration stream was 1.8% of the percentage of solids of the untreated raw syrup.

EXAMPLE V

Using the same electrodialyzer as in Example I and employing No. 10 membrane described in Table A as the NS membrane and Aciplex CK–1 as the K membrane, 6 liters of cane sugar final molasses adjusted to 50.6° Bx. was desalinated by electrodialyssis for 240 minutes under the operating conditions of 3.4 volts cell voltage, 10.3–4.1 amperes/dm.² current density, and 70 liters/hour flow rate. The results obtained are shown in Table 5. The process of this desalination is also detailed in FIG. 9. In this case, the sugar loss from leakage into the concentration stream was 0.3% of the percentage of solids of the untreated raw syrup.

TABLE 5

|  | °Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 50.6 | 33.2 | 27.1 | 5.06 | 1.7250 | 14.2 } | 76.4 | 54.5 |
| Treated syrup | 38.5 | 40.5 | 31.9 | 5.35 | 0.3759 | 3.95 } |  |  |

EXAMPLE VI

Using the same electrodialyzer as in Example I and employing No. 16 shown in Table A as the NS membrane and Aciplex CK-1 as the K membrane, 3.0 liters of beet low green syrup adjusted to 51.3° Bx. was desalinated by electrodialysis for 140 minutes under the operating conditions of 2.4 volts cell voltage, 6.6–3.7 amperes/dm.$^2$ current density, and 70 liters/hour flow rate. The results obtained are shown in Table 6. The process of this desalination is also detailed in FIG. 10. In this case, the sugar loss from leakage into concentration stream was negligible.

cy of 68.5% after 420 minutes. The sugar leakage to the middle compartment rinse stream was 2.3% of the percentage of solids in the untreated dilution stream, and the salt content in final middle compartment rinse stream was lowered to about 0.05 equivalent/liter.

The middle compartment rinse stream can be reused for more batch operations by intermittent addition of salt until sugar leakage from the middle compartment into the concentration compartment occurs due to accumulation of sugar content in the middle compartment rinse stream. Then the middle compartment rinse stream is renewed and the used rinse stream is mixed with the dilution stream. By this procedure, the sugar leakage to the

TABLE 6

|  | ° Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 51.3 | 81.1 | 0.25 | 9.10 | 0.8335 | 9.03 | 72.8 | 52.0 |
| Treated syrup | 41.3 | 88.0 | 0.19 | 8.80 | 0.1987 | 2.91 | | |

EXAMPLE VII

Using the same electrodialyzer as in Example I and employing No. 17 shown in Table A as the NS membrane and Aciplex CK-1 as the K membrane, 3.0 liters of thin juice from a beet sugar factory was desalinated by electrodialysis for 60 minutes under the operating conditions of 2.1 volts cell voltage, 1.5–0.9 amperes/dm.$^2$ current density, and 100 liters/hour flow rate. The results obtained are shown in Table 7. In this case, the sugar loss from leakage into the concentration stream was 0.91% of the percentage of solids of the untreated raw syrup.

middle compartment rinse stream can be recovered, and no sugar loss in the overall plant operation occurs. The sugar leakage to the concentration stream is negligible.

Table 8 shows the degree of desalination, the current efficiency, etc. from an analysis of the raw and treated syrup of this example.

TABLE 8

|  | ° Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 48.0 | 61.7 | 18.1 | 6.30 | 0.8427 | 10.02 | 58.0 | 68.5 |
| Treated syrup | 31.0 | 67.2 | 18.5 | 6.30 | 0.2548 | 4.29 | | |

TABLE 7

|  | ° Bx. | Purity, percent | Reducing sugar, percent | pH | Total cation content, eq./l. | Sulfate ash, percent | Desalination rate, percent | Current efficiency, percent |
|---|---|---|---|---|---|---|---|---|
| Raw syrup | 13.9 | 95.68 | Trace | 8.90 | 0.0789 | 0.515 | 77.3 | 41.0 |
| Treated syrup | 12.2 | 96.71 | ...do... | 8.30 | 0.0198 | 0.105 | | |

EXAMPLE VIII 3.0 liters of low grade sugar refining syrup adjusted to 48.0° Bx. was desalinated by electrodialysis in using the apparatus shown in FIG. 3 employing No. 17 membrane in Table A as the NS membrane, Aciplex CA-1 (manufactured by Asahi Chemical Industry Co., Ltd.) as the A membrane, and Aciplex CK-1 as the K membrane. This desalination by electrodialysis was conducted for 240 minutes using an electrodialyzer consisting of 18 sheets each of NS membranes, the A membranes, and the K membranes each having 0.775 dm.$^2$ effective membrane area and set up on a gasket with 2.3 mm. of membrane distance. 6.0 liters each of a concentration stream and 6.0 liters of a middle compartment rinse stream of 0.11 N NaCl solution were used. This desalination was accomplished batch-wise under operating conditions of 0.50 volt cell voltage, 0.66–0.35 amper/dm.$^2$ current density, and 150 liters/hour flow rate. The results were a desalination rate of 58.0% and an overall current efficien-

EXAMPLE IX

A low-grade sugar refinery syrup adjusted to 50.4° Bx. was desalinated by electrodialysis. Using the same electrodialyzer as in Example I employing No. 16 in Table A as the NS membrane and Aciplex CK-1 as the K membrane each having 0.775 dm.$^2$ of effective membrane area, desalination by electrodialysis was carried out batch-wise with 9.0 liters of this syrup. The desalination process continued for 260 minutes under the conditions of 2.1 volts cell voltage, 7.2–3.7 amperes/dm.$^2$ current density, and 70 liters/hour flow rate. As the concentration stream 9.0 liters of 0.1 N NaCl solution initial concentration was used with a batch-wise recirculation stream.

A comparison of the ratio of sugar recovery after boiling in a test vacuum pan between the raw syrup and the desalinated syrup showed the sugar recovery of the untreated syrup was 28.8%, while that of the treated syrup was 31.8%. This increase in recovery corresponds to 10.4% of the sugar recovery of the untreated syrup.

Table 9 shows the degree of desalination, sugar recovery, etc. from an analysis of the raw and treated syrup of this example.

TABLE 9

|  | ° Bx. | Purity, percent | Reducing sugar, percent | pH | Stammer color value | Total cation content, eq./l. | Sulfate ash, percent | Desalination rate, percent | Sugar recovery, percent |
|---|---|---|---|---|---|---|---|---|---|
| Raw syrup | 50.4 | 59.3 | 18.0 | 6.50 | 496 | 0.9315 | 9.68 | 78.9 | 28.8 |
| Treated syrup | 43.2 | 66.6 | 19.1 | 6.60 | 490 | 0.1776 | 2.04 | | 31.8 |

EXAMPLE X 20 liters of the same untreated raw syrup of Example IX was subjected to carbonation treatment. 3% of CaO based on the solids in the untreated raw syrup was mixed into the raw syrup to form an emulsion. The carbonation treatment was applied to the above mixture while holding the temperature at 65° C. This carbonation was conducted twice. In the first step, the treatment was applied until pH 10, and the resulting precipitate filtered out. The second carbonation treatment was applied to the above filtrate until pH 7.5 and the resulting precipitate filtered out. The thus obtained syrup hereafter is described as carbonation treated syrup.

15 liters of the above obtained carbonation treated syrup was applied to electrodialysis for 460 minutes in a batch-wise system using the electrodialyzer as in Example IX and 15 liters of 0.1 N NaCl solution initial concentration as the concentration stream. The operating conditions were 2.1 volts cell voltage, 7.9–2.6 amperes/dm.$^2$ current density, and 70 liters/hour flow rate. The resulting syrup hereafter is described as carbonation-desalination treated syrup.

After boiling in a test vacuum pan the above treated sugar solution, the results of each sugar recovery procedure were compared. The carbonation treated syrup was 29.0%, showing 0.2% increase over the untreated syrup (this increase is 0.7% against the sugar recovery of the untreated syrup). The sugar recovery of carbonation-desalination treated liquor was 34.5%, showing 5.7% increase in the sugar recovery over the untreated syrup. This increase corresponds to 19.8% against the sugar recovery of the untreated syrup.

As described above, the desalination treatment alone brought 3.0% increase in sugar recovery over that of the untreated syrup, and the carbonation treatment brought 0.2% increase in recovery over that of the untreated syrup. Therefore, if the two treatments were applied together the expected recovery increase would be a simple addition of the two increases that occurred separately. Thus, 3.2% (3.0% + 0.2%) recovery increase would be expected; however, a 5.7% recovery increase was actually accomplished. The additional 2.5% (5.7% − 3.2%) is considered to be a multiplicative effect of the above combination of the two treatments.

Table 10 shows each analytical value, the degree of desalination, and the sugar recovery of carbonation treated syrup and carbonation-desalination treated syrup.

above treated syrup was called as Adster-desalination treated syrup.

Then, in order to obtain a desalination treated syrup with subsequent Adster treatment, 9 liters of the same raw syrup used in Examples IX and X was desalinated by electrodialysis for 120 minutes with a batch-wise system, using the same electrodialyzer as used in Example IX and employing 9 liters of 0.1 N NaCl solution initial concentration as the concentration stream. The operating conditions were of 2.1 volts cell voltage, 6.8–3.2 amperes/dm.$^2$ current density, and 70 liters/hour flow rate. The above desalination treated syrup was filtered as the above mentioned Adster filtration discarding for the first 30 minutes; the remaining effluent was collected and named as desalination-Adster treated syrup.

Sugar recovery was accomplished by boiling respectively the Adster treated syrup, the Adster-desalination treated syrup, and desalination-Adster treated syrup in a test vacuum pan in the same way as in Example IX. The 29.5% sugar recovery obtained with Adster treated syrup was 0.7% higher than the sugar recovery from the raw syrup. This value corresponds to 2.4% recovery increase against the recovery from the raw syrup. With the Adster-desalination treated syrup, a 34.4% recovery was obtained showing 5.6% higher than the sugar recovery of the raw syrup. This value corresponds to 19.4% recovery increase against the recovery from the raw syrup. With the desalination-Adster treated syrup, the recovery was 34.3%, which was approximately equal to the value with the Adster-desalination treated syrup.

A 3.0% increase in recovery over that of the raw syrup was obtained by the desalination process as in Example IX. With the Adster treated syrup a 0.7% increase in recovery over that of the untreated syrup was obtained. In spite of this, with the Adster treatment in addition to the desalination treament, a 5.6% of increase in recovery over that of the untreated was accomplished. Thus, a higher recovery by 1.9% (6.6% against recovery of raw syrup) than total increase of 3.7% (0.7% + 3.0%) accomplished separately by the Adster treatment and the desalination treatment was achieved from the combination. This difference occurred through the multiplicative effect from the combination and clearly exceeded the addition of the two recoveries obtained from the application

TABLE 10

| | ° Bx; | Purity, percent | Reducing sugar, percent | pH | Stammer color value | Total cation content, eq/l. | Sulfate ash, percent | Desalination rate, percent | Sugar recovery, percent |
|---|---|---|---|---|---|---|---|---|---|
| Raw syrup | 50.4 | 59.3 | 18.0 | 6.50 | 496 | 0.9315 | 9.68 | | 28.8 |
| Carbonation treated syrup | 50.1 | 59.8 | 9.7 | 7.30 | 320 | 1.1348 | 11.8 | −18.0 | 29.0 |
| Carbonation-desalination treated syrup | 41.5 | 70.3 | 10.4 | 7.20 | 310 | 0.1995 | 2.43 | 78.9 | 34.5 |

EXAMPLE XI

The same raw syrup used in Examples IX and X was treated through a column charged with 4 liters of Adster (regenerated, 5 cycles) for 10 hours with S.V.=0.5 at a temperature of 70–75° C. The effluent collected from the first 2-hour period was discarded, and the subsequent effluent collected for the next 8-hour period. This effluent is hereafter called Adster treated syrup.

of the two treatments independently. Also, when the desalination treatment was applied first and then Adster treatment, about the same multiplicative effect was observed. Table 11 shows the analytical values, the degree of desalination, and the recoveries of the desalination treated syrup, desalination Adster treated syrup, etc. used in this example.

TABLE 11

| | ° Bx. | Purity, percent | Reducing sugar, percent | pH | Stammer color value | Total cation content, eq./l. | Sulfate ash, percent | Desalination rate, percent | Sugar recovery, percent |
|---|---|---|---|---|---|---|---|---|---|
| Raw syrup | 50.4 | 59.3 | 18.0 | 6.50 | 496 | 0.9315 | 9.68 | | 28.8 |
| Adster-desalination treated syrup | 43.0 | 67.8 | 19.0 | 6.40 | 80.0 | 0.1642 | 2.04 | 78.5 | 34.4 |
| Adster treated syrup | 50.1 | 59.5 | 18.1 | 6.00 | 91.4 | 0.9130 | 9.50 | 1.9 | 29.5 |
| Desalination treated syrup | 42.3 | 66.7 | 18.8 | 6.70 | 485 | 0.1712 | 2.15 | 77.1 | 31.8 |
| Desalination Adster treated syrup | 39.3 | 67.5 | 19.2 | 6.00 | 80.2 | 0.1487 | 2.06 | 78.2 | 34.3 |

6 liters of this Adster treated syrup was desalinated by electrodialysis for 150 minutes with a batch-wise system using the same electrodialyzer as used in Example IX and employing 6 liters of 0.1 N NaCl solution initial concentration as the concentration stream. The operating conditions were of 2.1 volts cell voltage, 7.5–3.5 amperes/dm.$^2$ current density, and 70 liters/hour flow rate. The

EXAMPLE XII

Powdered bone char (less than 50 mesh of particle size, C 8.0%, $Ca_3(PO_4)_2$ 87.0%, $CaCO_3$ 3.4%, others 1.6%) was added in an amount providing 4% thereof based upon the solids in 8 liters of the raw syrup used in Example IX contained in a 10-liter enameled beaker heated at 70° C. and agitated continuously. After 40 minutes, the above mixture was filtered with vacuum through Tetron cloth precoated with kieselguhr, to obtain cleared syrup. This cleared syrup was named as bone char treated syrup.

Using the apparatus for desalination by electrodialysis that was used in Example IX and using 6 liters of 0.1 N treated syrup is further desalinated to a small extent by the bone char treatment.

As a summary, Table 12 shows the analytical values, the degrees of desalination, and the sugar recoveries of the bone char treated syrup, the bone char-desalination treated syrup, the desalination treated syrup, and the desalination-bone char treated syrup used in this example.

TABLE 12

| | °Bx. | Purity, percent | Reducing sugar, percent | pH | Stammer color value | Total cation content, eq./l. | Sulfate ash, percent | Desalination rate, percent | Sugar recovery, percent |
|---|---|---|---|---|---|---|---|---|---|
| Raw syrup | 50.4 | 59.3 | 18.0 | 6.50 | 496 | 0.9315 | 9.68 | | 28.8 |
| Bone char treated syrup | 51.8 | 59.6 | 18.3 | 6.30 | 440 | 0.9301 | 9.29 | 4.1 | 29.4 |
| Bone char-desalination treated syrup | 44.2 | 67.8 | 18.8 | 6.50 | 430 | 0.1847 | 2.24 | 75.7 | 33.5 |
| Desalination treated syrup | 41.9 | 66.8 | 19.0 | 6.60 | 490 | 0.1756 | 2.16 | 78.7 | 31.8 |
| Desalination bone char treated syrup | 43.0 | 68.3 | 19.3 | 6.50 | 400 | 0.1571 | 1.95 | 82.5 | 33.8 |

NaCl solution initial concentration as the concentration stream, 6 liters of the above obtained bone char treated syrup was desalinated by electrodialysis for 150 minutes with a batch-wise system. The operating conditions were of 2.1 volts cell voltage, 7.0–4.4 amperes/dm.$^2$ current density, and 70 liters/hour flow rate. The obtained syrup was named as bone char-desalination treated syrup.

Then, a desalination process was accomplished on the syrup prior to the bone char treatment using the apparatus for a desalination by electrodialysis that was used in Example IX and using 6 liters of 0.1 N NaCl solution initial concentration as the concentration stream. Six liters of the raw syrup used in Example X was desalinated by electrodialysis for 200 minutes with a batch-wise system. The operating conditions were of 2.1 volts cell voltage, 7.1–3.6 amperes/dm.$^2$ current density, and 70 liters/hour flow rate. Table 12 shows the analytical values and so forth of this treated syrup. Six liters of this desalination treated syrup was then subjected to the same bone char treatment as described above, and the resulting syrup was named as desalination-bone char treated syrup.

The bone char treated syrup, bone char-desalination treated syrup, and desalination-bone char treated syrup were separately boiled in a similar way as in Example IX to compare each sugar recovery. The recovery from bone char treated syrup was 29.4%, which recovery was higher by 0.6% than the recovery from the raw syrup. This corresponds to a recovery increase of 2.1% against the recovery of the raw syrup. In the bone char-desalination treated syrup, a recovery of 33.5% was obtained, which recovery was higher by 4.7% than the recovery of the raw syrup. This corresponds to a recovery increase of 16.3% against the recovery of the raw syrup. In the desalination-bone char treated syrup, a recovery of 33.8% was obtained, which recovery was higher by 5.0% than the recovery of the untreated liquor. This corresponds to a recovery increase of 17.4% against the recovery of the raw syrup.

In the case of raw syrup treated only with bone char, the increase of sugar recovery was confined to a 0.6% increase over the recovery from the raw syrup; however, if this bone char treated syrup was subjected subsequently to desalination treatment, the obtained sugar recovery increase was 4.7%, more than the recovery of the raw syrup. This was higher by 1.1% (3.8% against the recovery of the raw syrup) than the sum of each recovery; a 3.6% increase (0.6+3.0%) would be obtained when the bone char and the desalination treatment were applied separately. This 1.1% increase in sugar recovery was brought about as the multiplicative effect by conducting, together, both the removal of organic nonsugar by the bone char treatment and removal of ash by the desalination treatment. When bone char treatment was conducted after the desalination treatment, a similar multiplicative effect was shown; in fact, this sequence accomplished a multiplicative effect greater by 0.3% than in case of the bone char-desalination treatment. It seems that the desalination

EXAMPLE XIII

After adjusting affination syrup (hereafter referred to as A.S.) from a sugar refinery to 48.80° Bx., 6 liters of this syrup was electrodesalinated for 180 minutes with a batch-wise desalination method using the electrodialyzer used in Example IX and employing 6 liters of 0.1 N NaCl solution initial concentration as the concentration stream. The above process was carried out under the operating conditions of 2.1 volts cell voltage, 6.4–2.5 amperes/dm.$^2$ current density, and 70 liters/hour flow rate. The resulting desalination treated syrup was named as A.S.-desalination treated syrup.

Using 20 liters of the above untreated A.S., carbonation treatment was conducted under the same conditions as in the carbonation treatment in Example X. This carbonation treated syrup was named as A.S.-carbonation treated syrup.

Nine liters of this A.S.-carbonation treated syrup was desalinated by electrodialysis for 280 minutes with a batch-wise desalination system using the electrodialyzer used in Example IX and employing 9 liters of 0.1 N NaCl solution initial concentration as the concentration stream. The above process was carried out under the operating conditions of 2.1 volts cell voltage, 6.0–1.9 amperes/dm.$^2$ current density, 70 liters/hour flow rate. This treated syrup was named as A.S.-carbonation-desalination syrup.

The untreated A.S. raw sugar, the A.S.-desalination treated syrup, the A.S.-carbonation treated syrup, and the A.S.-carbonation-desalination treated syrup were boiled separately in a test vacuum pan as the samples in Example IX to compare each recovery.

While the sugar recovery of the untreated A.S. was 38.6%, the A.S.-desalination treated syrup that was treated to 73.2% of desalination showed 44.0% recovery which recovery was higher by 5.4% than that from the untreated A.S. This corresponds to 14.0% increase against the sugar recovery of the untreated A.S. The A.S.-carbonation treated syrup showed a 41.1% recovery which recovery was higher by 2.5% than that from the untreated A.S. This corresponds to 6.5% increase against the sugar recovery of the untreated A.S. The A.S.-carbonation-desalination treated syrup showed 47.3% recovery which recovery was higher by 8.7% than that from the untreated A.S.

Since a 2.5% recovery increase was achieved only by the carbonation treatment and a 5.4% recovery increase only by the desalination treatment, the sum of the two recovery increases that was expected as additive effect of the two treatments combined together would be 7.9%. However, since a 8.7% recovery increase was actually accomplished, the difference of 0.8% (8.7%−7.9%) is the recovery increase achieved as a multiplicative effect brought about by the combination of the two treatments.

As a summary, Table 13 shows the analytical values, the degree of desalination, and sugar recoveries of the untreated A.S., the A.S.-desalination treated syrup, the A.S.- carbonation treated syrup, and the A.S.-carbonation-desalination treated syrup.

TABLE 13

|  | °Bx. | Purity, percent | Reducing sugar, percent | pH | Stammer color value | Total cation content, eq./l. | Sulfate ash, percent | Desalination rate, percent | Sugar recovery, percent |
| --- | --- | --- | --- | --- | --- | --- | --- | --- | --- |
| A.S. (raw syrup) | 48.8 | 75.2 | 6.88 | 5.75 | 450 | 0.5335 | 5.68 |  | 38.6 |
| A.S.-desalination treated syrup | 41.0 | 78.8 | 6.90 | 5.80 | 435 | 0.1155 | 1.55 | 73.2 | 44.0 |
| A.S.-carbonation treated syrup | 48.5 | 80.1 | 1.96 | 7.20 | 220 | 0.5186 | 5.53 | 2.6 | 41.1 |
| A.S.-carbonation-desalination treated syrup | 40.0 | 84.2 | 2.03 | 7.10 | 200 | 0.1134 | 1.56 | 72.2 | 47.3 |

EXAMPLE XIV

Using the same electrodialyzer as in Example I and employing Tohcello Vinylon Film—No. 200 (trademark of polyvinyl alcohol film manufactured by Tokyo Serofan Co., Ltd.) as the NS membranes and Aciplex CK–1 as the K membranes, 12 liters of low-grade syrup from a sugar refinery adjusted to 50.9° Bx. was desalinated by electrodialysis for 300 minutes. The operating conditions were 2.0 volts cell voltage, 4.0–1.8 amperes/dm.$^2$ current density, and 70 liters/hour flow rate. The results obtained are shown in Table 14.

In this case, the sugar loss by leakage into the concentration stream was 0.7% of the percentage of solids of the untreated raw syrup.

TABLE 14

|  | °Bx. | Purity, percent | Reducing sugar, percent | Total cation content, eq./l. | Sulfate ash, percent | Desalination rate, percent | Current efficiency, percent |
| --- | --- | --- | --- | --- | --- | --- | --- |
| Raw syrup | 50.9 | 64.4 | 20.2 | 0.6377 | 6.42 | 80.4 | 39.5 |
| Treated syrup | 45.2 | 70.4 | 20.4 | 0.1182 | 1.33 |  |  |

EXAMPLE XV

This example illustrates the preparation of a polyvinyl alcohol membrane hereinafter referred to as membrane $P_1$. A mixture of 54.8 grams of vinylpropionic acid, 28.8 grams of vinylchloride, and 0.3 gram of d,d'-azobisisobutylonitrile was sealed in a glass ampoule and agitated to dissolve the mixture thoroughly. The mixture was heated to 50° C. for 20 hours to carry out polymerization. The polymer obtained was contacted with a solution of methanol saturated with potassium hydroxide to saponify the propionate group in the polymer. The polymer was analyzed to contain 45-mole percent —(CH$_2$CHOH)— groups. A thin film membrane was then prepared by the dry method of casting.

The electrical resistance of membrane $P_1$ in a 0.5 N solution of sodium chloride just after the membrane was prepared ($R_0$) was found to be 4.6 ohms/cm.$^2$, and the electrical resistance after 700 hours of continuous desalination operation ($R_1$) was found to be 4.7 ohms/cm.$^2$. The tensile strength of the membrane before dialysis ($T_0$) was 2.4 kg./mm.$^2$, and the tensile strength after 700 hours of operation ($T_1$) was 2.3 kg./mm.$^2$.

EXAMPLE XVI

This example illustrates the preparation of a polyvinyl alcohol membrane hereinafter referred to as membrane $P_2$. 35 parts of a commercial vinyl acetate-ethylene copolymer containing 25-mole percent vinyl acetate were dissolved in 65 parts by weight of toluene. A woven polypropylene fiber having 80 yarns per inch of 100-denier fiber was immersed into the solution as a reinforcement member for the membrane. The solution was subjected to vacuum and the membrane was obtained from the dried residual solution. After drying, the membrane was contacted with methanol saturated with potassium hydroxide for 10 hours at 40° C. to obtain a saponified polymer product. Membrane $P_2$ was found to have the following characteristics: $R_0$=7.6 ohms/cm.; $R_1$=7.8 ohms/cm.; $T_0$=4.3 kg./mm.$^2$; $T_1$=4.3 kg./mm.$^2$.

EXAMPLE XVII

This example illustrates the preparation of a polyvinyl alcohol membrane hereinafter referred to as membrane $P_3$. A solution of 20 parts of polyvinyl alcohol which has a degree of polymerization of 1500 and 98-mole percent —(CH$_2$CHOH)—, 5 parts of ethylene glycol and 75 parts of water was prepared. The solution was cast into a thin film of 0.15 mm. thickness by the wet method and heated to 205° C. for 3 minutes to obtain a membrane.

Membrane $P_3$ was found to have the following characteristics: $R_0$=2.0 ohms/cm.$^2$; $R_1$=2.0 ohms/cm.$^2$; $T_0$=1.8 kg./mm.$^2$; $T_1$=1.6 kg./mm.$^2$.

EXAMPLE XVIII

This example illustrates the preparation of a polyvinyl alcohol membrane hereinafter referred to as membrane $P_4$. A membrane was obtained by the process as described in Example XVII. This membrane was immersed and swelled in a mixture comprising 30 parts by weight pyridine and 70 parts of chloroform. The swollen form was contacted with a solution of 2 parts by weight of stearyl chloride dissolved in 8 parts by weight of pyridine in order to achieve partial esterification. The resulting polymer was analyzed to contain 55-mole percent

—(CH$_2$CHOH)—

Membrane $P_4$ was found to have the following characteristics: $R_0$=4.8 ohms/cm.$^2$; $R_1$=4.8 ohms/cm.$^2$; $T_0$=1.9 kg./mm.$^2$; $T_1$=1.9 kg./mm.$^2$.

It is claimed:

1. A desalination process by electrodialysis of sugar solution, in which process the cation-exchange membranes are placed at the cathode side and the ion-permeable membranes having an anion or cation exchange capacity less than about 0.3 milliequivalent/gram of dry membrane at the anode side, being characterized by an arrangement of contacting the said solutions to be treated with only the above-mentioned two membranes.

2. A desalination process for the removal of salts from sugar solutions by electrodialysis using cation-exchange membranes, anion-exchange membranes and ion-permeable membranes having an anion or cation exchange capacity of less than about 0.3 milliequivalent/gram of dry membrane, wherein these membranes are put in order of a cation-exchange membrane, an ion-permeable membrane and an anion-exchange membrane from the cathode to the anode and these three membranes are repeatedly arranged as one unit in above mentioned order.

3. A desalination process as claimed in claim 1 wherein each said ion-permeable membrane is a polyvinyl alcohol membrane.

4. A desalination process as claimed in claim 1 wherein each said ion-permeable membrane is a polyvinyl alcohol containing membrane having at least 10-mole percent —(CH$_2$CHOH)— groups in the polymer.

5. A desalination process as claimed in claim 2 wherein each said ion-permeable membrane is a polyvinyl alcohol membrane.

6. desalination process as claimed in claim 2 wherein each said ion-permeable membrane is a polyvinyl alcohol containing membrane having at least 10-mole percent —$(CH_2CHOH)$— groups in the polymer.

7. A desalination process as claimed in claim 1 wherein more than about 30% of the salt content of the sugar solution is removed therefrom.

8. A desalination process as claimed in claim 2 wherein more than about 30% of the salt content of the sugar solution is removed therefrom.

9. A desalination process as claimed in claim 3 wherein more than about 30% of the salt content of the sugar solution is removed therefrom.

10. A desalination process as claimed in claim 4 wherein more than about 30% of the salt content of the sugar solution is removed therefrom.

11. A desalination process as claimed in claim 5 wherein more than about 30% of the salt content of the sugar solution is removed therefrom.

12. A desalination process as claimed in claim 6 wherein more than about 30% of the salt content of the sugar solution is removed therefrom.

13. A desalination process as claimed in claim 1 wherein the desalination is carried out in conjunction with carbonation of sugar solution.

14. A desalination process as claimed in claim 2 wherein the desalination is carried out in conjunction with carbonation of sugar solution.

15. A desalination process as claimed in claim 3 wherein the desalination is carried out in conjunction with carbonation of sugar solution.

16. A desalination process as claimed in claim 4 wherein the desalination is carried out in conjunction with carbonation of sugar solution.

17. A desalination process as claimed in claim 5 wherein the desalination is carried out in conjunction with carbonation of sugar solution.

18. A desalination process as claimed in claim 6 wherein the desalination is carried out in conjunction with carbonation of sugar solution.

19. A desalination process as claimed in claim 7 wherein the desalination is carried out in conjunction with carbonation of the sugar solution.

20. A desalination process as claimed in claim 8 wherein the desalination is carried out in conjunction with carbonation of the sugar solution.

21. A desalination process as claimed in claim 9 wherein the desalination is carried out in conjunction with carbonation of the sugar solution.

22. A desalination process as claimed in claim 10 wherein the desalination is carried out in conjunction with carbonation of the sugar solution.

23. A desalination process as claimed in claim 11 wherein the desalination is carried out in conjunction with carbonation of the sugar solution.

24. A desalination process as claimed in claim 12 wherein the desalination is carried out in conjunction with carbonation of the sugar solution.

25. A desalination process as claimed in claim 1 wherein the desalination is carried out in conjunction with phosphatation of sugar solution.

26. A desalination process as claimed in claim 2 wherein the desalination is carried out in conjunction with phosphatation of sugar solution.

27. A desalination process as claimed in claim 3 wherein the desalination is carried out in conjunction with phosphatation of sugar solution.

28. A desalination process as claimed in claim 4 wherein the desalination is carried out in conjunction with phosphatation of sugar solution.

29. A desalination process as claimed in claim 5 wherein the desalination is carried out in conjunction with phosphatation of sugar solution.

30. A desalination process as claimed in claim 6 wherein the desalination is carried out in conjunction with phosphatation of sugar solution.

31. A desalination process as claimed in claim 7 wherein the desalination is carried out in conjunction with phosphatation of the sugar solution.

32. A desalination process as claimed in claim 8 wherein the desalination is carried out in conjunction with phosphatation of the sugar solution.

33. A desalination process as claimed in claim 9 wherein the desalination is carried out in conjunction with phosphatation of the sugar solution.

34. A desalination process as claimed in claim 10 wherein the desalination is carried out in conjunction with phosphatation of the sugar solution.

35. A desalination process as claimed in claim 11 wherein the desalination is carried out in conjunction with phosphatation of the sugar solution.

36. A desalination process as claimed in claim 12 wherein the desalination is carried out in conjunction with phosphatation of the sugar solution.

37. A desalination process as claimed in claim 1 wherein the desalination is carried out in conjunction with adsorption of nonsugar organic matter from the sugar solution with solid, particulate adsorbent.

38. A desalination process as claimed in claim 2 wherein the desalination is carried out in conjunction with adsorption of nonsugar organic matter from the sugar solution with solid, particulate adsorbent.

39. A desalination process as claimed in claim 3 wherein the desalination is carried out in conjunction with adsorption of nonsugar organic matter from the sugar solution with solid, particulate adsorbent.

40. A desalination process as claimed in claim 4 wherein the desalination is carried out in conjunction with adsorption of nonsugar organic matter from the sugar solution with solid, particulate adsorbent.

41. A desalination process as claimed in claim 5 wherein the desalination is carried out in conjunction with adsorption of nonsugar organic matter from the sugar solution with solid, particulate adsorbent.

42. A desalination process as claimed in claim 6 wherein the desalination is carried out in conjunction with adsorption of nonsugar organic matter from the sugar solution with solid, particulate adsorbent.

43. A desalination process as claimed in claim 7 wherein the desalination is carried out in conjunction with adsorption of nonsugar organic matter from the sugar solution with solid, particulate adsorbent.

44. A desalination process as claimed in claim 8 wherein the desalination is carried out in conjunction with adsorption of nonsugar organic matter from the sugar solution with solid, particulate adsorbent.

45. A desalination process as claimed in claim 9 wherein the desalination is carried out in conjunction with adsorption of nonsugar organic matter from the sugar solution with solid, particulate adsorbent.

46. A desalination process as claimed in claim 10 wherein the desalination is carried out in conjunction with adsorption of nonsugar organic matter from the sugar solution with solid, particulate adsorbent.

47. A desalination process as claimed in claim 11 wherein the desalination is carried out in conjunction with adsorption of nonsugar organic matter from the sugar solution with solid, particulate adsorbent.

48. A desalination process as claimed in claim 12 wherein the desalination is carried out in conjunction with adsorption of nonsugar organic matter from the sugar solution with solid, particulate adsorbent.

(References on following page)

References Cited

UNITED STATES PATENTS

| | | | |
|---|---|---|---|
| 3,285,776 | 11/1966 | Scallet et al. | 127—30 |
| 3,383,245 | 5/1968 | Scallet et al. | 127—38 X |
| 3,472,750 | 10/1969 | Campbell et al. | 204—180 P |
| 3,475,216 | 10/1969 | Walon | 127—46 |
| 3,544,436 | 12/1970 | Francis et al. | 204—180 P |
| 3,595,769 | 7/1971 | Scheder | 204—180 P |
| 3,657,106 | 4/1972 | Smith | 204—301 |

JOHN H. MACK, Primary Examiner

A. C. PRESCOTT, Assistant Examiner

U.S. Cl. X.R.

204—301; 127—46, 53